Figure 1:
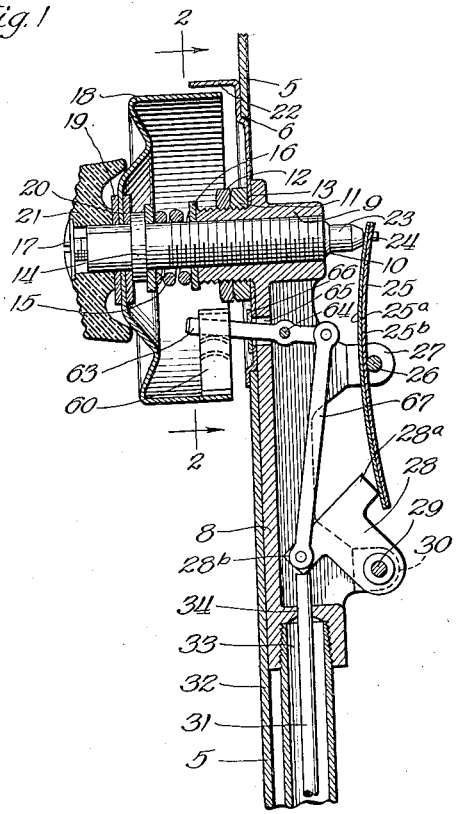

July 24, 1934.  E. G. STEFFEN  1,967,727

CONTROL DEVICE

Filed Jan. 4, 1932

Inventor:
Elmer G. Steffen

By Brown, Jackson, Boettcher & Dienner
attys.

Patented July 24, 1934

1,967,727

UNITED STATES PATENT OFFICE 1,967,727

CONTROL DEVICE

Elmer G. Steffen, Milwaukee, Wis., assignor to Milwaukee Gas Specialty Company, Milwaukee, Wis., a corporation of Wisconsin Application January 4, 1932, Serial No. 584,668

25 Claims. (Cl. 236—15)

This invention relates to control devices, and more particularly is directed to control devices such as are attached to ovens, heaters and the like, to control the temperature thereof and to maintain any desired pre-selected temperature within the oven or heater.

The invention is directed more specifically to a control device for an oven which is adapted to control the temperature of the oven over a predetermined range, and which is provided with means for locking the temperature selecting device in a desired position. The particular type of control device contemplated in the invention comprises a selecting means, a thermally sensitive element, a control transmitting means, and a control valve adapted to be actuated by means of the selecting means, and is provided with a lock-out lever adapted to lock the control valve so that it will remain in its open position regardless of variations in temperature within the oven.

It is to be noted, in connection with ovens provided with the usual control devices of this type, that there is a marked tendency for the gas supply to the oven to close or diminish during long periods of use at high temperatures, such as at temperatures used for broiling or like cooking operations. This is due mainly to heating up of the elements surrounding the oven, consequent expansion of parts, and the tendency which the thermally sensitive member associated with such control has to warp away from its operative position and close the control valve. However, frequently it is very desirable that the oven be supplied with a sufficient volume of gas to operate it at its greatest possible temperature so that broiling operations or the like may be carried on successfully, or it may be desirable to lock the control valve in some other open position so that it will remain in that position notwithstanding temperature variations.

It is therefore the purpose of the present invention to provide a control device adapted to select and maintain any desired temperature over the range of cooking operations, and which, in its extreme open position, corresponding to the temperature desired for broiling operations or in some other desired position, is provided with a locking arrangement which operates to maintain the control valve in that position regardless of oven temperature.

Other objects and advantages of my present invention will be more apparent from the following detailed description, which, taken in connection with the accompanying drawing, discloses the specific construction and operation of a preferred form of my invention.

Figure 2:
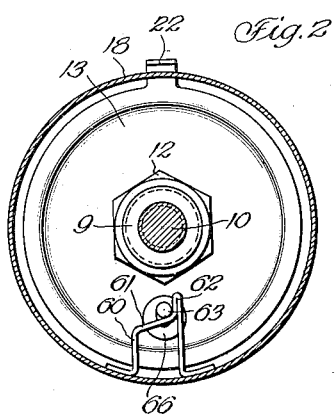

In the drawing:

Figure 1 is a vertical sectional view of a device embodying my present invention, showing the same mounted in operative position on the wall of an oven; and Figure 2 is a section taken substantially on the line 2—2 of Figure 1, showing in detail my novel locking arrangement.

Referring to the drawing, an exterior wall of an oven is indicated by the reference numeral 5. This may be any wall of the oven, but is preferably the side wall adjacent the grate burners. The oven wall 5 has two openings cut or formed therein for receiving the selecting means and the control valve of my control device. The respective openings for the selecting means and the control valve are indicated at 6 and 7.

The selecting means comprises a frame indicated generally at 8, which is provided with an enlarged cylindrical housing portion 9 at its upper end. This housing portion 9 extends transversely of the frame 8, is threaded internally to receive a spindle 10, and is provided with a pair of lock nuts 11 and 12 threaded externally thereon and serving to clamp the housing to a cover plate or flange 13. This cover plate 13 fits about the housing 9 and is properly indented to form a closure for the opening 6 after the selecting means has been passed through the opening.

The spindle 10 is provided with a flanged portion 14 and a spring 15 is positioned about the spindle and has one end bearing against a washer which abuts the flange. The other end of the spring is biased against a coaxial plate washer 16 carried by the spindle 10 and bearing against the outwardly projecting portion of the housing 9.

The portion of the spindle extending outwardly from the flange 14 is reduced in diameter and is provided with an internally threaded recess adapted to receive an adjusting screw 17. A cup-shaped dial member 18 is secured about the spindle 10 and is held in frictional engagement with the flange 14 by means of two friction washers 19 and 20. This dial member 18 is provided with suitable temperature markings (not shown), and in a preferred form, the dial member carries temperature markings running from 250 degrees to 550 degrees. This range of temperature corresponds to the range of temperature existing between a "slow" oven and a "broiling" oven.

A control knob or actuating member 21 is secured upon the spindle and is urged inwardly into engagement with the friction washer 19 by means of the adjusting screw 17. The dial can be positioned in any angular relationship to the spindle 10 by merely loosening the adjusting screw and thus disengaging the friction washers from the dial. The dial can then be rotated about the spindle to the desired position. It is thus possible to calibrate the dial to accord with the spindle position within the housing 9. Thus the device may be accurately calibrated when installed for indicating the correct temperature existing within the oven.

It is evident that upon rotation of the control knob 21, the dial 18 is rotated, and an indicator or reference finger 22, formed by a projecting portion of the cover plate 13, serves to indicate the dial marking corresponding to the temperature desired within the oven. Rotation of the control valve also threads the spindle 10 in the housing 9 and serves to move the spindle transversely thereof.

The inwardly extending end of the spindle 10 has a reduced portion 23 terminating in a stud portion 24. The stud portion 24 moves toward and away from the housing 9 upon rotation of the spindle 10. In the preferred form of the device, rotation of the spindle 10 in a clockwise direction urges the stud portion 24 outwardly away from the oven wall 5.

A bi-metallic, thermally sensitive member 25 is provided, which is of generally rectangular configuration, and which has an opening formed in its upper end to cooperate with the stud shaft 24. This thermally sensitive member 25 comprises the two metallic strips, 25a and 25b, which possess different coefficients of thermal expansion, the strip 25a having the greater coefficient of expansion. Upon being subjected to heat, the tendency is for the element 25 to warp away from the housing.

The bi-metallic member 25 is pivoted approximately at its center about a pivot pin 26 supported between two shoulders 27 extending outwardly from the frame 8. The lower end of the member 25 has abutting contact with a bell crank member 28 mounted for rotation upon a shaft or pivot 29 supported between a second pair of shoulders 30 extending outwardly from the frame 8. It is to be understood that any suitable transmitting means might be employed in place of the bell crank member without departing from the present invention. This bell crank comprises an arm 28a contacting the thermally sensitive member 25 and a second arm 28b contacting a control rod 31.

This control rod 31 comprises a metallic rod possessed of sufficient rigidity to transmit compressive stresses, and is mounted within a suitable conduit or tubing 32 which has its upper end threaded into a recess 33 formed in the lower portion of the housing 9. The recess 33 has an upwardly extending reduced portion, indicated at 34, which serves as a guide for the control rod 31 and which allows the control rod to have free sliding movement therein.

The lower end of the tubing 32 is threaded into an upwardly extending portion 35 of a control valve, indicated generally by the numeral 36. This control valve 36 is positioned between the oven burner and the gas supply manifold, and serves to control the volume of combustible gas and air mixture passing to the oven burner. It comprises the valve body 37 which has an inner partition or dividing wall 38 adapted to define an inlet chamber 39 and an outlet chamber 40. The partition wall 38 is provided with a cut-out portion adapted to form a valve opening 41 for permitting flow of combustible gas and air mixture from the inlet opening 39 to the outlet opening 40. The inlet 39 is connected by means of a suitable conduit 39' to the gas mixing chamber positioned adjacent the gas supply manifold. A suitable conduit 40' leads from the outlet chamber 40 to the oven burner, thus allowing gas to pass from the gas supply manifold through the mixing chamber and the control valve to the oven burners.

Positioned within the valve body 37 is a valve member 42, of the "mushroom" type, which is adapted to move up and down within the valve body 37 for opening and closing the valve opening 41. The valve member 42 is provided with a suitable control stem 43 which passes through a suitable bushing 44 threaded into the upwardly extending portion 35 of valve body 37. This bushing 44 is provided at its upper end with a reduced portion adapted to extend into the tubing 32, and has a cylindrical recess 45 formed therein for receiving the control rod 31.

The control rod 31 has abutting contact with the upper end portion of the valve stem 43 and suitable packing means may be positioned within the recess 45, also within the recess 33 and, if desired, within the recess 45' for providing a gas-tight connection therebetween. The valve member 42 has a projecting boss portion 46 about which a spring member 47 is adapted to seat against the valve member 42 to urge the valve to closed position. The other end of the spring member 47 is biased in a recess formed in a cap member 48 threaded or otherwise suitably secured in the valve body 37. The spring member 47 urges the valve member 42 toward its closed position, and thus urges the valve stem 43 into abutting contact with the control rod 31. This results in the control rod 31 having abutting contact with the arm 28b of the bell crank 28 and causes the bell crank to tend to rotate in a clockwise direction. This results in the arm 28a having secure abutting contact with the lower end of the thermally sensitive member 25, producing a control transmitting motion which has no lost motion connection in any of its component parts.

It is evident that upon rotation of the spindle 10, the thermally sensitive member 25 will rotate or rock about the pivot 26 and will urge the bell crank 28 in a counter-clockwise direction to force the control rod 31 downwardly. This results in the lower end of the control rod 31 engaging the valve stem 43 and opening the valve 42 against the pressure of the spring 47. Upon opposite rotation of the spindle 10, spring 47 will close the valve 42 and will transfer its force through the control stem 31 to the bell crank 28 and thermally sensitive member 25.

Referring again to the valve body 37, it will be noted that the partition wall 38 has a by-pass 49 formed therein, and a threaded adjusting screw is positioned in the valve body and has the tapered end 50 for limiting the effective area of the by-pass. This by-pass is provided for allowing some gas to pass through the control valve 36 even when the valve member 42 is closed and shuts off the opening 41. The amount of gas allowed to pass through the by-pass 49 is just sufficient to maintain a flame at the burners, and is provided for assuring that the burners will be ignited whenever the main gas cock on the gas supply manifold is opened.

For instance, it may sometimes happen that the gas cock will be opened, and the control device will be in closed position. In such cases, it is desirable that the gas flowing through the mixing chamber be allowed to pass through the control device and be ignited, rather than escape from the mixing chamber to the surrounding atmosphere.

A suitable pilot connection is made to the control valve by means of the pilot tube 52, the by-pass 53 and the adjusting screw 54. This connection is of any usual or convenient type, and forms no part of the present invention. It might be stated, however, that this pilot connection at all times affords means for igniting the burners.

It is therefore apparent that over the entire range of dial markings corresponding to a temperature range within the oven of approximately 300 degrees, that is, 250 degrees to 550 degrees, the valve will respond to actuation of the thermally sensitive member 25 and will be opened a proportionate amount upon rotation of the selecting means. After the valve has once been opened to the desired position by the selecting means, the thermally sensitive member serves to vary the valve setting automatically and independently of the selecting means to maintain the temperature within the oven at the desired point.

This is accomplished by the member 25 warping away from the bell crank 28 when the temperature within the oven becomes higher than that desired, thus diminishing the volume of gas passing through the control valve. As the temperature within the oven drops, the member 25 tends to straighten and thus tends to open the valve again. This automatically controlled fluctuation of the control valve maintains the temperature within the oven practically constant for all temperatures within the range of the control device.

However, when a "broiling" oven temperature is required, which is about 550 degrees or greater, the intense heat within the oven warps the thermally sensitive member to a much greater extent, and the temperature may drop considerably, yet not sufficiently to return the thermally sensitive member to a position for maintaining the valve in full open position. Thus the oven remains at a temperature lower than the "broiling" temperature desired.

Therefore I have provided means for locking the control valve in full open position when the selecting means is rotated to this position, and which will retain the valve in full open position independently of temperature variations and fluctuations of the thermally sensitive member until the selecting means is returned from its full open position.

This locking means comprises a cam 60, of the form shown in Figure 2, which has depending flange portions adapted to be welded or otherwise suitably secured to the inner periphery of the dial member 13. This cam 60 is formed of a flat strip of a suitable metal pressed or otherwise formed into the shape shown in Figure 2, and has the ascending cam surface 61 and the cam stop 62.

A cam lock-out lever 63 is pivoted about a suitable pivot pin 64 mounted in a horizontal position in the frame 8 and the lever projects through an opening 65 formed in the housing and a co-operating opening formed in the cover plate 13. A guide, washer or plate 66 is positioned about the opening in the cover plate 13 and is provided with a slotted portion receiving the extending end of the lever 63 and guiding the movement thereof. The other end of the lever 63 has a pivotal connection with a link 67, this link being pivoted at its other end to the arm 28b of the bell crank 28.

It is evident that, upon rotation of the selecting means from a substantially "off" position in a clockwise direction, the arm 28b of the bell crank will be rotated in a counterclockwise direction. It is to be understood, of course, that the direction of the rotation of the spindle 10 and the bell crank 28 may be reversed or changed to conform to structural features of the particular oven in which the device is installed.

This rotation of the arm 28b will pull the link 67 downwardly and will result in pivoting the lock-out lever 63 about the pivot 64, tending to raise the end of the lever projecting through the opening 65.

As the 550 degree mark is reached, the lock-out lever will be raised sufficiently to lie upon the surface 61 of the cam 60. Further rotation will cause the lever to be forced upwardly along this cam surface until the stop 62 is reached. In this position, the cam surface 61, the lever 63 and the link 67 serve to hold the valve 42 in its maximum open position, and will maintain the valve in such position regardless of temperature variations and fluctuations of the thermally sensitive member 25.

As the selecting means is rotated toward closing position, the lock-out lever 63 will ride downwardly along the cam surface 61 and will then drop off the cam surface and remain inactive during the remainder of the temperature range. It is therefore apparent that I have provided a lock-out arrangement which will function to maintain the valve in its maximum open position, as shown in Figure 1, regardless of freeing of the spring 47 by straightening of the thermal sensitive member and the tendency of the spring to close the valve. I have also provided an automatic control of oven temperature for all other points of the range of the control device, and have so arranged the lock-out means that it will be inoperative except at the maximum open position.

I do not intend to be limited to the exact features as shown and described, but only insofar as defined by the spirit and scope of the appended claims.

I claim:—

1. In a thermostatic heat regulator, the combination of a control device, selecting means for setting said control device for different temperatures, means including a thermostatic element for operating said control device upon temperature variations to maintain substantially selected temperatures, and means for rendering said last means inoperative to maintain a selected setting of said control device irrespective of temperature conditions, said last means being operative only at substantially the maximum temperature setting of said selecting means.

2. In combination, a control device, thermally responsive means for operating said control device to maintain substantially a predetermined temperature, setting means for determining said temperature, and means engaging said setting means for preventing closing movement of said control device from a selected open position.

3. In combination, selecting means for controlling a fuel supply; a thermally sensitive member associated therewith, and means associated with said selecting means for rendering said thermally sensitive member inoperative when said selecting means is positioned to supply a maximum quantity of fuel.

4. In combination, selecting means, a housing for supporting said selecting means, a thermally sensitive member pivotally mounted on said housing, a control device, control transmitting means pivotally mounted on said housing for transmitting action of said selecting means to said control device, and means cooperating with said selecting means for holding said control device in maximum open position independently of temperature conditions.

5. In a device of the class described, a selecting means, a thermally sensitive member, a control device, control transmitting means transmitting action of said selecting means through said thermally sensitive member to said control device, and means effecting control between said selecting means and said control device independently of said thermally sensitive member.

6. In a device of the class described, a selecting means, a thermally sensitive member, a control device, control transmitting means transmitting action of said selecting means through said thermally sensitive member to said control device, and means independent of said thermally sensitive member for controlling said control device when said device is in maximum open position.

7. In a device of the class described, a selecting means, a thermally sensitive member, a control device, control transmitting means transmitting action of said selecting means through said thermally sensitive member to said control device, and means independent of said thermally sensitive member for effecting control between said selecting means and said control device when said control device is in open position.

8. In a thermally operated device, selecting means, a thermally sensitive member, a fuel supply, a control therefor, means for effecting control of said fuel supply through said thermally sensitive member up to the maximum open position of said control, and means cooperating with said selecting means for effecting control of said fuel supply at said maximum position independently of said thermally sensitive member.

9. In a thermally operated device, selecting means, a dial associated therewith, a thermally sensitive member, a fuel supply, a control therefor, means for effecting control of said fuel supply through said thermally sensitive member up to the maximum open position of said control, and means cooperating with said dial and rendered operative by operation of said dial for effecting control of said fuel supply at said maximum position.

10. In a thermally operated device, selecting means, a cam surface associated therewith, a thermally sensitive member, a fuel supply control, means for effecting control of said fuel supply through said thermally sensitive member up to the maximum open position of said control, and means cooperating with said cam surface for effecting control of said fuel supply at said maximum position.

11. In a thermally operated device, selecting means, a thermally sensitive member, a fuel supply control, means for effecting control of said fuel supply through said thermally sensitive member up to the maximum open position of said control, and means comprising a pivoted lever linked to said control means for effecting control of said fuel supply at said maximum position.

12. In a thermally operated device, selecting means, a thermally sensitive member, a fuel supply, a control therefor, means for effecting control of said fuel supply through said thermally sensitive member up to the maximum open position of said control, and means comprising a pivoted lock-out lever for effecting control of said fuel supply at said maximum position.

13. In a domestic gas range, an oven, a thermally operated device comprising selecting means, a thermally sensitive member, a fuel supply, a control therefor, means for effecting control of said fuel supply through said thermally sensitive member up to the maximum open position of said control, variations in temperature within said oven being transmitted to said control by said thermally sensitive member, and means cooperating with said selecting means for effecting control of said fuel supply at said maximum position independently of the action of said thermally sensitive member.

14. In a domestic gas range having an oven, a thermally operated device comprising selecting means, said selecting means comprising a spindle and a dial associated therewith, a cam surface on said dial, a thermally sensitive member actuated by said spindle, control transmitting means for transmitting the action of said selecting means, a control device, and means comprising a pivoted lever engaging said cam surface and linked to said control transmitting means for effecting full open position of said control device independently of thermal conditions when said control device is in open position.

15. In a device of the class described, a thermally sensitive device, a control device, a lever for transmitting the action of said thermally sensitive device to said control device, and link means connected to said lever for locking said control device in predetermined open position independently of the operation of said thermally sensitive device.

16. In a device of the class described, a thermally sensitive device, a control device, a bell crank lever for transmitting the action of said thermally sensitive device to said control device, a selecting device, cam means on said selecting device and link means connected to said bell crank lever and cooperable with said cam means for controlling said control device independently of said thermally sensitive device.

17. In combination, a control device, a selecting device, means for transmitting movement of said selecting device to said control device including a thermally sensitive member, and means cooperating with said selecting device at the end of its range of opening movement for rendering said thermally sensitive member inoperative.

18. In combination, selecting means, a control device, means extending between said selecting means and said control device providing for adjustment of said control device, said last named means including a thermally sensitive member adapted to control movement of said control device independently of said selecting means, and means engaging said selecting means for rendering said thermally sensitive member inoperative to effect closing movement of said control device.

19. In combination, in an oven, an oven wall, a housing secured to the inner surface of said wall, selecting means positioned exteriorly of said wall and extending through said housing, a control device supported below said housing, a thermally sensitive member actuated by said selecting means for controlling movement of said control device, said member being responsive to temperature conditions to actuate said control device independently of said selecting means, and means extending through said wall and engaging said selecting means for maintaining said control device in maximum open position irrespective of the position of said thermally sensitive member.

20. A device of the class described comprising a control device, thermally responsive means for operating said device, selecting means for adjusting the operating position of said thermally responsive means, and means including a pivoted locking lever engaging said selecting means for preventing closing movement of said control device from a fixed open position.

21. In combination, a rotatable selecting device having a rotatable dial, a valve member, motion transmitting means extending between said selecting device and said valve member, and link means carried by and movable with said motion transmitting means and engaging said dial at a predetermined position thereof for preventing further rotation of said selecting device in a direction tending to open said valve member.

22. In combination, a housing, a selecting spindle threaded therein, a thermally sensitive member pivotally mounted on said housing, a control device suspended beneath said housing, motion transmitting means between one end of said thermally sensitive member and said control device, a lever pivoted on said housing, a link connected between said lever and said motion transmitting means and movable in response to movement of said motion transmitting means, and means carried by said spindle and engaged by said lever for preventing rotation of said spindle and for maintaining said control device in fixed position, said last named means rendering said thermally sensitive means inoperative for actuating said motion transmitting means.

23. In combination, a selecting device, a control device, motion transmitting means therebetween, and means operable upon movement of said selecting device for locking said control device in maximum open position.

24. In combination, a control device, rotatable selecting means therefor, thermally sensitive means for said control device, and means engaged by said selecting means for automatically locking said control device in a predetermined open position and for rendering said thermally sensitive means inoperative, reverse rotation of said selecting means releasing said locking means and restoring operation of said thermally sensitive means.

25. In combination, a control device, a selecting device, a thermally sensitive member engaged by said selecting device, motion transmitting means between said thermally sensitive member and said control device, and means connected to said motion transmitting means and directly engaging said selecting device for preventing closing movement of said control device when said selecting device is in preselected operative position irrespective of movement of said thermally sensitive member.

ELMER G. STEFFEN.